US012760795B2

(12) United States Patent
Lebeau

(10) Patent No.: US 12,760,795 B2
(45) Date of Patent: Oct. 13, 2026

(54) PROPULSION SYSTEM PROVIDED WITH A LOCKING DEVICE, SUCH AS A PARKING BRAKE

(71) Applicant: VALEO EMBRAYAGES, Amiens (FR)

(72) Inventor: Fabien Lebeau, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/871,550

(22) PCT Filed: Jun. 29, 2023

(86) PCT No.: PCT/EP2023/067853
§ 371 (c)(1),
(2) Date: Dec. 4, 2024

(87) PCT Pub. No.: WO2024/003263
PCT Pub. Date: Jan. 4, 2024

(65) Prior Publication Data
US 2025/0354605 A1 Nov. 20, 2025

(30) Foreign Application Priority Data
Jun. 30, 2022 (FR) ...................................... 2206687

(51) Int. Cl.
*F16H 63/34* (2006.01)

(52) U.S. Cl.
CPC ..... *F16H 63/3425* (2013.01); *F16H 63/3416* (2013.01); *F16H 63/3466* (2013.01)

(58) Field of Classification Search
CPC .. F16H 63/34; F16H 63/3416; F16H 63/3458; F16H 63/3466; F16H 2057/02034; F16H 2057/02043; F16H 2057/0216
See application file for complete search history.

(56) References Cited

U.S. PATENT DOCUMENTS 8,590,425 B2 * 11/2013 Pesola .................... B60K 6/547 74/330
10,920,884 B2 2/2021 Tamura et al.
(Continued)

FOREIGN PATENT DOCUMENTS

CN 107763163 A * 3/2018 ......... F16H 63/3466
CN 114321334 A * 4/2022 ......... F16H 57/0025
(Continued)

OTHER PUBLICATIONS

International Search Report issued Sep. 5, 2023 in PCT/EP2023/067853, filed on Jun. 29, 2023, 2 pages.

*Primary Examiner* — Bobby Rushing, Jr.
(74) *Attorney, Agent, or Firm* — Oblon, McClelland, Maier & Neustadt, L.L.P.

(57) ABSTRACT

A propulsion system for a mobility device includes a casing defining a motor space and an electric motor housed in the motor space. The electric motor includes a stator provided inside the motor space and a rotor mounted to a primary shaft to rotate therewith, the rotation of the primary shaft being guided about an axis relative to the casing with a first bearing and a second bearing which are respectively arranged on either side of the rotor. A locking gear is connected to the primary shaft so as to rotate therewith and is intended to cooperate with a locking mechanism which is arranged so as to assume a locked state in which the locking mechanism cooperates with the locking gear to prevent the rotation thereof about the axis. The locking gear is positioned between the first bearing and the second bearing.

20 Claims, 5 Drawing Sheets

(56) References Cited

U.S. PATENT DOCUMENTS

| | | | | | |
|---|---|---|---|---|---|
| 11,300,193 | B2 * | 4/2022 | Li | F16H 57/021 |
| 2021/0207710 | A1 | 7/2021 | Schmidt et al. | |
| 2021/0231213 | A1 | 7/2021 | Miebach et al. | |

FOREIGN PATENT DOCUMENTS

| | | | | | |
|---|---|---|---|---|---|
| DE | 102021203495 | B3 * | 3/2022 | B60K 6/36 |
| EP | 3 478 992 | B1 | 4/2020 | |
| WO | WO-2021151598 | A1 * | 8/2021 | F16H 63/3458 |
| WO | WO-2022106681 | A1 * | 5/2022 | B60T 1/062 |

* cited by examiner

PROPULSION SYSTEM PROVIDED WITH A LOCKING DEVICE, SUCH AS A PARKING BRAKE

TECHNICAL FIELD

The invention relates to the field of propulsion systems for a mobility apparatus, such as a motor vehicle, provided with a locking device.

The invention relates in particular to propulsion systems comprising an electric motor together with a locking device, such as a parking brake, making it possible to immobilize the propulsion system so as to prevent the mobility apparatus from moving unintentionally. Such a propulsion system can also comprise a reduction device receiving the torque supplied by the rotor of the electric motor together with a differential device for distributing the torque from the reduction device to two half-shafts of an axle of the vehicle, allowing the two half-shafts to rotate at different speeds.

TECHNOLOGICAL BACKGROUND

EP3478992 discloses a propulsion system of the aforementioned type. The parking brake comprises a parking brake housing that is fastened to the casing of the electric motor, a locking shaft that is housed in the parking brake housing and rigidly connected to the shaft of the rotor for rotation therewith, a locking gear that is rigidly connected to the locking shaft for rotation therewith, and a locking mechanism that comprises an immobilizing element that is able to move between a released state and a locked state in which it interacts with the locking gear so as to prevent it from rotating, which immobilizes the propulsion system and thus prevents the motor vehicle from moving unintentionally.

The locking shaft is guided in rotation inside the parking brake housing by means of a dedicated roller bearing. This roller bearing is dimensioned to absorb significant radial forces that are generated by the immobilizing element on the locking gear and consequently on the locking shaft that holds it. Such a propulsion system is not entirely satisfactory. The parking brake comprises a roller bearing, a locking shaft and a housing that solely serve the purposes of the parking brake, which increases the cost and complexity of the propulsion system.

SUMMARY

One idea behind the invention is therefore to propose a propulsion system of the aforementioned type, that is, comprising a locking device, such as a parking brake, that is less complex and less costly.

To this end, according to a first aspect, the invention provides a propulsion system for a mobility apparatus, comprising:

- a casing comprising a motor space;
- an electric motor that is housed in the motor space, said electric motor comprising a stator fastened inside the motor space and a rotor rigidly mounted on a primary shaft for rotation therewith, the primary shaft being guided in rotation about an axis X, relative to the casing, by means of a plurality of bearings, the plurality of bearings comprising at least a first bearing and a second bearing that are respectively positioned axially on either side of the rotor;
- a locking gear that is rigidly connected to the primary shaft for rotation therewith about the axis X, said locking gear being capable of and intended for interacting with a locking mechanism that is arranged to adopt a locked state in which said locking mechanism interacts with the locking gear so as to prevent it from rotating about the axis X, said locking gear being positioned axially between the first bearing and the second bearing.

The first and second bearings thus make it possible to guide the rotation of both the rotor and the locking gear, which makes it possible to eliminate one or more dedicated bearings for absorbing the forces exerted on the locking gear. The aforementioned propulsion system is therefore simpler and less costly. In addition, the positioning of the locking gear, between the first and second bearings, ensures satisfactory distribution of the forces exerted on the locking gear.

According to embodiments, such a propulsion system can comprise one or more of the following features.

According to one embodiment, none of the bearings of the plurality of bearings is positioned axially between the first bearing and the second bearing. The plurality of bearings can thus comprise the first bearing and the second bearing only, or one or more other additional bearings. In the case of one or more additional bearings, the first and second bearings are respectively closest to the rotor on either side of the rotor. In other words, the guide bearing of the primary shaft closest to the first bearing, on the other side of the rotor, is the second bearing, and the guide bearing of the primary shaft closest to the second bearing, on the other side of the rotor, is the first bearing.

According to one embodiment, the mobility apparatus is a motor vehicle.

According to one embodiment, the locking gear is integrally formed with the primary shaft, in particular with the rotor shaft. This makes it possible to limit the number of components of the propulsion system and helps in particular to simplify the assembly thereof.

According to another embodiment, the locking gear is a separate part from the primary shaft that is mounted thereon and rigidly connected thereto for rotation therewith, for example by means of splines.

According to one embodiment, the locking gear comprises a plurality of cavities, the propulsion system comprising a locking mechanism comprising a locking finger that is able to move between a released position and a locked position in which said locking finger is capable of being housed in one of the cavities of the locking gear so as to prevent it from rotating.

According to one embodiment, the cavities are made on a periphery of said locking gear.

According to one embodiment, the locking mechanism is positioned outside the motor space. This particularly prevents the increase in the footprint of the motor space that would result from housing the locking mechanism therein.

According to one embodiment, the locking mechanism further comprises:

- a pawl that is pivotably mounted on the casing and comprises the locking finger, said pawl comprising a cam surface;
- a movable carriage that is guided in translation by means of a guide rail fastened to the casing, the movable carriage comprising a cam follower capable of moving on the cam surface of the pawl in order to pivot said pawl and thus move the locking finger between the released position and the locked position.

According to one embodiment, the cam follower is a roller.

According to one embodiment, the movable carriage comprises a roller capable of moving against a guide surface of the guide rail.

According to one embodiment, the locking mechanism is mounted in the transmission space.

The transmission space is defined by two parts of the casing that are fastened to each other.

According to one embodiment, the pawl is pivotably mounted about a rod. According to one embodiment, the rod is mounted bearing on each of the two parts that define the transmission space.

According to one embodiment, the propulsion system further comprises an actuator that interacts with the locking mechanism so as to move the locking finger between the released position and the locked position.

According to one embodiment, the actuator interacts with a rod fastened to the movable carriage.

According to one embodiment, the actuator is positioned outside the casing. This prevents the increase in the footprint of the casing that would result from housing the actuator therein.

According to one embodiment, the propulsion system comprises a reduction device comprising an input gear that is coaxial with the axis X and rigidly connected to the primary shaft for rotation therewith, the reduction device being housed in a transmission space of the casing.

According to one embodiment, the input gear and the locking gear are arranged axially on either side of the rotor. This architecture makes it possible in particular to free up space in the reduction device.

According to another embodiment, the input gear and the locking gear are arranged axially on the same side of the rotor, the locking gear being arranged axially between the rotor and the input gear.

The primary shaft can be formed in one piece. In other words, the primary shaft can be a rotor shaft extending axially beyond the motor space.

According to one variant, the primary shaft can comprise a plurality of coaxial shafts coupled to each other. For example, the primary shaft can comprise a rotor shaft coupled to an input shaft holding the input gear or on which the input gear is directly formed.

According to one embodiment, the input gear is a sprocket.

According to one embodiment, the input gear can be situated on a free end zone of the primary shaft. In other words, all of the guide bearings guiding the primary shaft are situated axially on the same side of the input gear.

According to one embodiment, the primary shaft is guided by two bearings only, namely the first bearing and the second bearing. The guiding of the primary shaft is thus simplified.

According to one embodiment, the casing comprises a first and a second end wall, the first and second end walls respectively comprising a first recess and a second recess, the first bearing and the second bearing being housed in the first recess and in the second recess respectively.

According to one embodiment, the first and second end walls define two ends of a motor compartment.

According to one embodiment, the first bearing and the second bearing are roller bearings.

According to one embodiment, each of the first and second bearings comprises an inner ring, an outer ring, and rolling bodies interposed between the inner ring and the outer ring.

According to one embodiment, the rolling bodies are selected from balls, rollers and needles.

According to one embodiment, the first bearing and the second bearing are respectively fitted onto first and second inner seating surfaces of the primary shaft, each of the first and second inner seating surfaces being delimited toward the other by first and second axial bearing surfaces of the primary shaft.

According to one embodiment, the first recess comprises a first outer seating surface and a first axial bearing surface of the casing, the first bearing being positioned radially between the first inner seating surface and the first outer seating surface and axially between the first axial bearing surface of the primary shaft and the first axial bearing surface of the casing.

According to one embodiment, the second recess comprises a second outer seating surface and a second axial bearing surface of the casing, the second bearing being positioned radially between the second inner seating surface and the second outer seating surface and axially between the second axial bearing surface of the primary shaft and the second axial bearing surface of the casing.

According to one embodiment, the primary shaft is guided by two bearings only, namely the first bearing and the second bearing.

According to one embodiment, if the primary shaft is guided by more than two bearings, the first and second bearings are the bearings closest to the rotor axially on either side of the rotor.

In other words, no other guide bearing is interposed between the first and the second guide bearings.

According to one embodiment, the input gear is a separate part from the primary shaft.

According to one embodiment, the input gear is rigidly connected to the primary shaft for rotation therewith by means of splines.

According to one embodiment, the input gear bears against a shoulder of the primary shaft and against a retaining ring mounted in a groove of the primary shaft.

According to one embodiment, the locking gear and the input gear are positioned axially on either side of the second bearing.

According to one embodiment, the second end wall comprises an opening that is made facing at least one cavity of the locking gear and through which a locking finger of the locking mechanism can pass when said locking finger is in a locked position. This makes it possible for the locking mechanism to be positioned outside the motor space, and for example in a transmission space, while acting on a locking gear supported by the bearings guiding the primary shaft in rotation.

According to one embodiment, the cavities are made on a periphery of said locking gear, the second end wall comprising a protruding portion that protrudes axially in the opposite direction to the motor compartment and in which the second bearing is positioned, the locking gear being housed in said protruding portion, the opening being made in said protruding portion radially facing the periphery of the locking gear.

According to one embodiment, the casing comprises a transmission space separated from the motor space by the second wall, which thus defines a motor compartment and a transmission compartment, the locking mechanism being housed in said transmission compartment. This makes it possible for the locking mechanism to be positioned outside the motor compartment, in a transmission compartment that makes it possible to simultaneously house the locking mechanism and other elements of the transmission line.

According to one embodiment, the casing comprises a transmission compartment, the second bearing contributing to the definition of the motor compartment and the transmission compartment.

According to one embodiment, the input gear and the rotor are situated axially on either side of the second bearing, or the locking gear and the input gear are situated axially on either side of the second bearing.

According to one embodiment, the propulsion system comprises a differential drive device that is configured to distribute the torque from the reduction device to two half-shafts of an axle of a vehicle.

According to one embodiment, the differential drive device is housed in the transmission space.

According to one embodiment, the reduction device comprises an intermediate shaft that is guided in rotation inside the transmission space about an axis Y, parallel to the axis X, the intermediate shaft being engaged with the input shaft by means of a first set of gears comprising the input gear, and engaged with the differential device by means of a second set of gears.

According to one embodiment, the differential device comprises a differential box that is guided in rotation about the axis Z, two planet pinions that are rotatably mounted on the differential box about an axis W perpendicular to the axis Z, and two sun gears that are able to rotate about the axis X, each engaged with the two planet pinions and each intended to directly or indirectly rotate a half-shaft.

According to one embodiment, the primary shaft is guided by the first and second bearings on its two end zones. These two end zones are housed in cavities of the casing.

The propulsion system is a system of the type having shared cooling and/or lubrication of the transmission space and the motor space.

The invention also relates to an electric machine comprising a rotor shaft and a locking gear rotatably coupled to the rotor shaft.

BRIEF DESCRIPTION OF THE FIGURES

The invention will be more clearly understood, and further aims, details, features and advantages thereof will become more apparent from the following description of several specific embodiments of the invention, given by way of non-limiting illustration only, with reference to the appended drawings.

DESCRIPTION OF THE EMBODIMENTS

In the description and the claims, the terms "outer" and "inner" and the orientations "axial" and "radial" will be used to denote elements of the propulsion system 1 according to the definitions given in the description. By convention, the axis X of rotation of the primary shaft 2 defines the "axial" orientation. The terms "outer" and "inner" are used to define the position of one element relative to another, with reference to the axis X; an element near the axis X is thus described as inner as opposed to an outer element situated radially peripherally.

Figure 1:
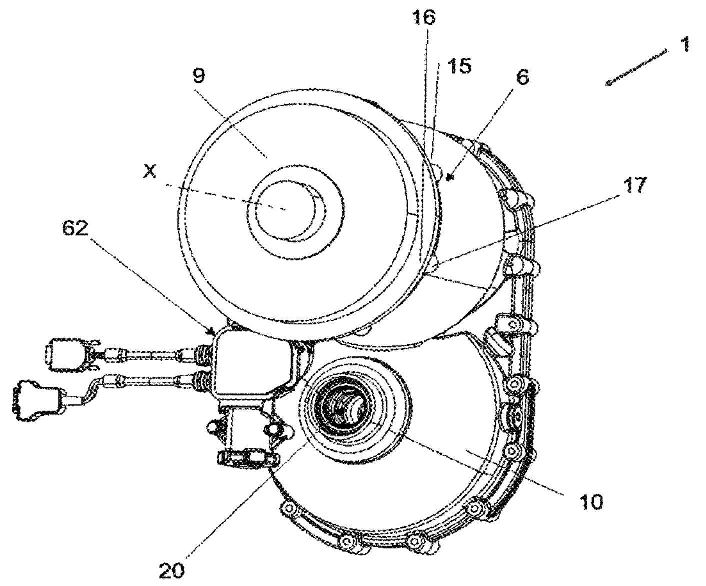
FIG. 1 is a perspective depiction of a propulsion system according to a first embodiment.
Figure 2:
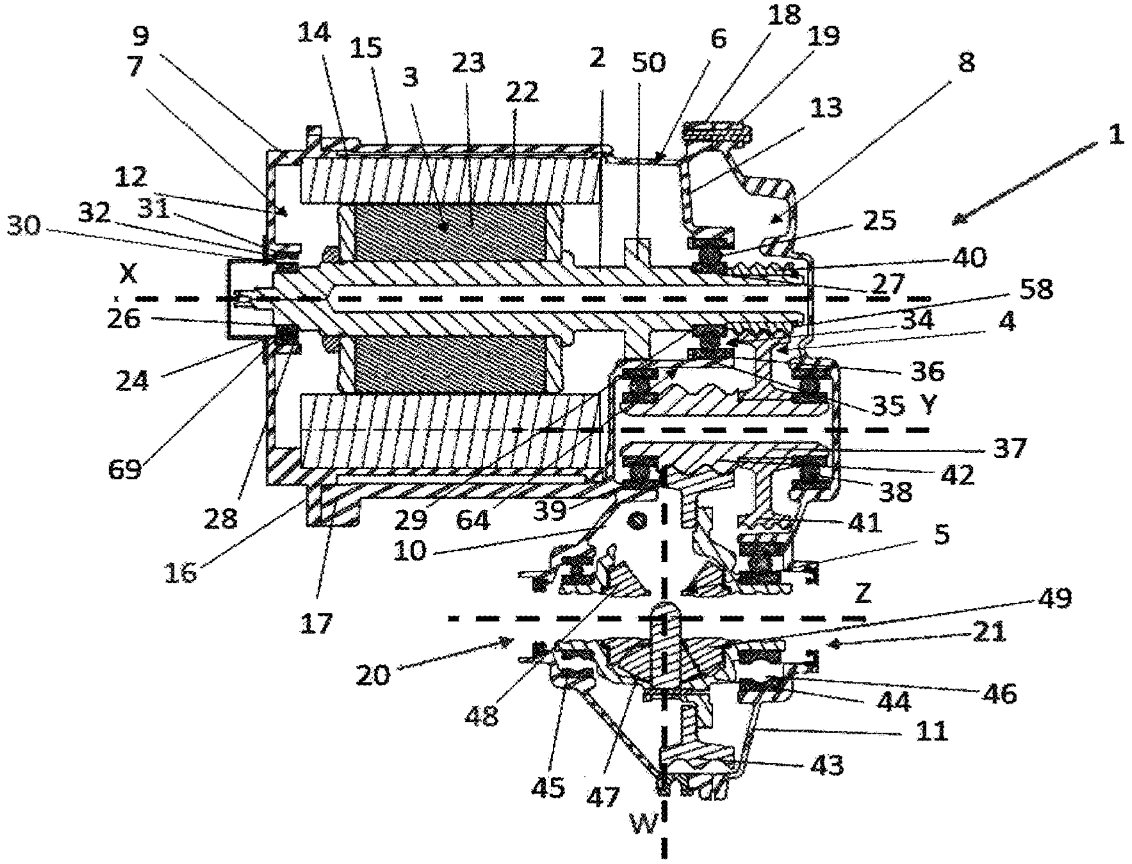
FIG. 2 is a cross-sectional view of the propulsion system in FIG. 1.

A propulsion system 1 according to a first embodiment is described with reference to FIGS. 1 to 5. As illustrated in FIG. 2, the propulsion system 1 comprises an electric motor 3, a reduction device 4 and a differential device 5. The propulsion system 1 is thus configured to generate torque by means of the electric motor 3, increase it by means of the reduction device 4, and distribute it to the two half-shafts, not shown, of an axle of the vehicle, allowing them to rotate at different speeds, by means of the differential device 5.

According to one exemplary embodiment, such a propulsion system 1 is intended for a hybrid vehicle. The aforementioned propulsion system is thus, for example, capable of transmitting torque from the electric motor 3 to a rear or front axle of the vehicle, while another propulsion system 1 comprising another motor or engine, such as a combustion engine, is capable of generating torque and transmitting it between this other motor or engine and the two half-shafts of the other axle of the vehicle. According to another example, the vehicle is electric.

The propulsion system 1 comprises a casing 6 that defines a motor space housing the electric motor 3, and a transmission space housing the reduction device 4 and the differential device 5. In the embodiment illustrated in FIG. 2, the casing 6 comprises three parts, namely a first part 9, a second part 10, and a third part 11 that are fastened to each other. The second part 10 is positioned axially between the first part 9 and the third part 11.

The first part 9 and the second part 10 together define a motor compartment 7. In the embodiment shown, the first part 9 and the second part 10 each comprise an end wall 12, 13 and a cylindrical skirt 14, 15 extending parallel to the axis X from the periphery of the end wall 12, 13. The first part 9 and the second part 10 each comprise a fastening flange 16, 17 that is fastened against the fastening flange 16, 17 of the other of the first and second parts 9, 10.

Likewise, the second part 10 and the third part 11 together define the transmission compartment 8. The second part 10 and the third part 11 are also fastened to each other by fastening flanges 18, 19. They each comprise a protruding boss. Each boss comprises an opening 20, 21 intended to receive one of the two half-shafts of an axle of the motor vehicle.

The structure of the casing 6 is described above solely by way of example. According to other embodiments, not shown, the casing 6 has a different structure. By way of example, the casing 6 can in particular comprise four parts that define in pairs the motor compartment 7 and the transmission compartment 8.

The electric motor 3 comprises a stator 22 that is fastened to the casing 6, inside the motor compartment 7, and a rotor

23 that is rotatably mounted about the axis X, inside the stator 22. To this end, the rotor 23 is rigidly connected to a primary shaft 2 for rotation therewith. The primary shaft 2 is guided in rotation by means of a first bearing 24 and a second bearing 25, such as roller bearings. The primary shaft 2 passes through the end wall 13 of the second part 10 and thus protrudes inside the transmission compartment 8.

Each of the first and second bearings 24, 25 comprises an inner ring, an outer ring, and rolling bodies interposed between the inner ring and the outer ring. The rolling bodies here are balls, but can also be rollers or needles in particular. Each of the first and second bearings can comprise one or more rows of rolling bodies. The inner ring of the first roller bearing 24 and the inner ring of the second roller bearing 25 are respectively fitted onto first and second inner seating surfaces 26, 27 of the primary shaft 2. Each of the first and second inner seating surfaces 26, 27 is delimited toward the other of the first and second inner seating surfaces by a shoulder 28, 29. The shoulders 28, 29 thus define first and second axial bearing surfaces against which the inner ring of the first bearing 24 and the inner ring of the second bearing 25 respectively abut.

The first bearing 24 is housed inside a cylindrical first recess 30, made in the first part 9 of the casing 6. The first recess 30 comprises a first outer seating surface 31 into which is fitted the outer ring of the first bearing 24, and a shoulder 32 that borders the first outer seating surface toward the outside of the motor compartment 7. The shoulder 32 thus defines a first axial bearing surface of the casing 6 against which abuts the outer ring of the first bearing 24. In the embodiment shown, a spring washer 69 is further positioned between the shoulder 32 and the outer ring of the first bearing 24.

The first bearing 24 is thus positioned radially between the first outer seating surface 32 of the first recess 30 and the first inner seating surface 26 of the primary shaft 2, and axially between the first axial bearing surface of the casing 6 and the first axial bearing surface of the primary shaft 2. The second bearing 25 is housed inside a cylindrical second recess 34, made in the second part 10 of the casing 6. The second recess 34 comprises a second outer seating surface 35 into which is fitted the outer ring of the second bearing 25, and a shoulder 36 that borders the second outer seating surface 35 toward the outside of the motor compartment 7. The shoulder 36 thus defines a second axial bearing surface of the casing 6 against which abuts the outer ring of the second bearing 25. The second bearing 25 is thus positioned radially between the second outer seating surface 35 of the second recess 34 and the second inner seating surface 27 of the primary shaft 2, and axially between the second axial bearing surface of the casing 6 and the second axial bearing surface of the primary shaft 2.

In addition, the reduction device 4 comprises an intermediate shaft 37 that is rotatably mounted inside the transmission compartment 8 about an axis Y, parallel to the axis X. The intermediate shaft 37 is guided in rotation inside the casing 6 by means of two bearings 38, 39, such as roller bearings, one of which is mounted in a recess made in the second part 10 of the casing 6 and the other of which is mounted in a recess made in the third part 11 of the casing 6. In addition, the reduction device 4 comprises an input gear 40 that is rigidly connected to the primary shaft 2 for rotation therewith, and two sprockets 41, 42 rigidly connected to the intermediate shaft 37 for rotation therewith. The input gear 40 is mounted on the portion of the primary shaft 2 that protrudes inside the transmission compartment 8. It is engaged with the largest input gear 41 of the intermediate shaft 37, while the smallest input gear 42 of the intermediate shaft 37 is engaged with an input gear 43 of the differential device 5. The reduction device 4 thus produces, from the electric motor 3 toward the differential device 5, a transmission ratio less than 1, which makes it possible to deliver higher torque to the half-shafts than is delivered at the output of the electric motor 3. In the embodiment shown, the input gear 40 is a separate part from the primary shaft 2 and is rigidly connected thereto for rotation therewith by means of splines. In addition, the input gear 40 abuts axially against the second bearing 25 (in particular the inner ring thereof) of the primary shaft 2 and bears against a retaining ring 58 mounted in a groove of the primary shaft 2, which makes it possible to fasten the input gear 40 axially to the primary shaft 2. As a variant, instead of bearing on the second bearing 25, the input gear 43 can bear against a shoulder of the primary shaft 2.

In addition, the differential device 5 comprises a differential box 44 that is rotatably mounted inside the transmission casing 6 about an axis Z that is parallel to the axes X and Y. In FIG. 2, the differential box 44 is guided in rotation by means of two bearings 45, 46, such as roller bearings, one of which is housed in a recess in the second part 10 and the other of which is housed in a recess in the third part 11. The differential box 44 is rotatably coupled to the input gear 42 of the differential device 5. The differential device 5 also comprises two planet pinions 47, just one of which is shown in FIG. 2, which are rotatably mounted inside the differential box 44, about an axis W perpendicular to the axis Z, as well as two sun gears 48, 49. The two sun gears 48, 49 each comprise bevel gear teeth that mesh with complementary bevel gear teeth of the two planet pinions 47. In addition, the two sun gears 48, 49 are able to rotate about the axis Z. Each of the sun gears 48, 49 comprises a splined hub intended to directly or indirectly rotate one of the two half-shafts, not shown, of an axle of the vehicle.

In addition, the propulsion system 1 comprises a locking device that makes it possible to immobilize the propulsion system in order to prevent the motor vehicle from moving unintentionally. The locking device comprises a locking gear 50, visible in particular in FIGS. 2 and 3, a locking mechanism 51, visible in FIGS. 3 and 4, and an actuator 62, visible in FIGS. 1 and 3.

Figure 6:
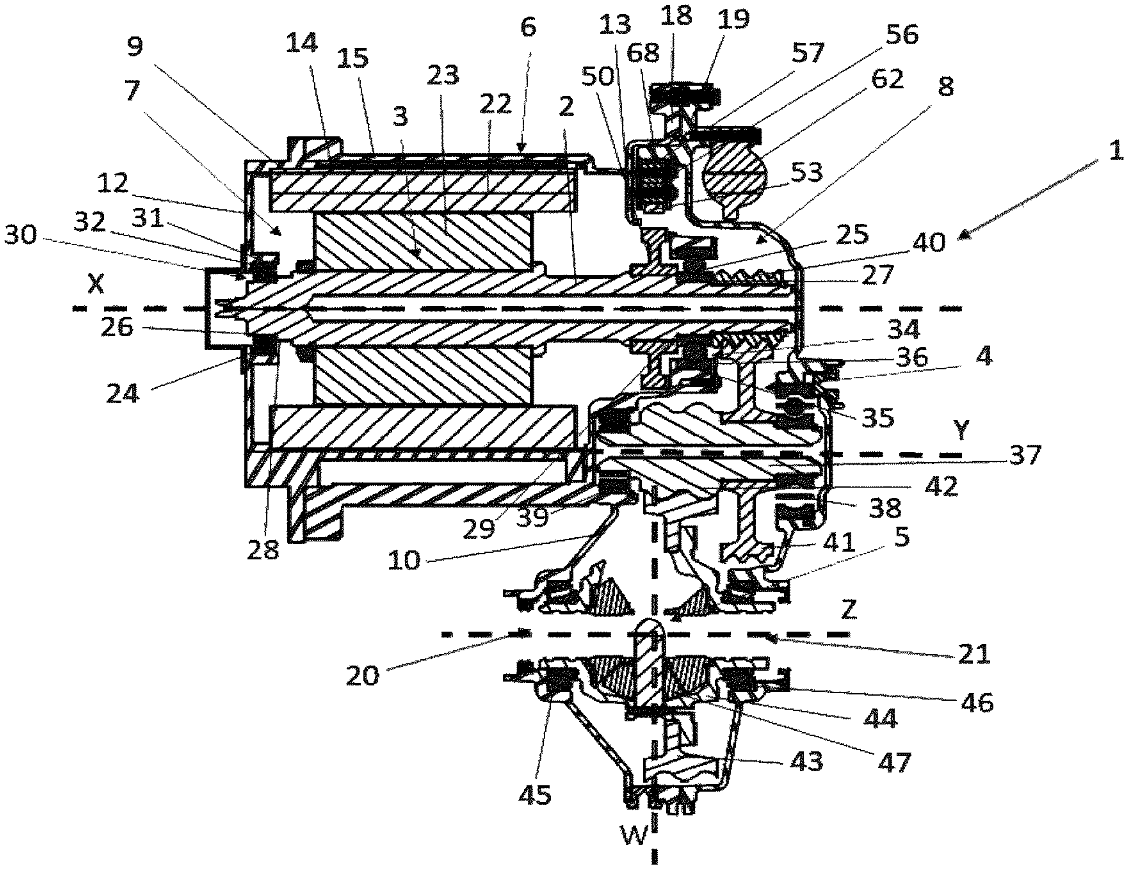
FIG. 6 is a cross-sectional view of a propulsion system according to a second embodiment.

The locking gear 50 is rigidly connected to the primary shaft 2 for rotation therewith. In the embodiment shown, the locking gear 50 is machined directly on the primary shaft 2, in particular the rotor shaft, as illustrated in FIG. 2 in particular. In other words, the primary shaft 2 and the locking gear 50 are integrally formed. In another embodiment, as shown in FIG. 6, the locking gear 50 is a separate part from the primary shaft 2. In such circumstances, it can in particular be fitted around the primary shaft 2, rigidly connected thereto for rotation therewith, for example by means of splines, and axially fastened thereto, between a shoulder made in the primary shaft 2 and a retaining ring mounted in a groove of the primary shaft 2.

The locking gear 50 is positioned axially between the first bearing 24 and the second bearing 25. The radial forces that can be exerted on the locking gear 50 by the locking mechanism 51 are thus absorbed by the first and second bearings 24, 25 guiding the rotor 23 in rotation, which makes it possible to eliminate a dedicated bearing for absorbing the forces exerted on the locking gear 50. Furthermore, as the locking gear 50 is positioned axially between the first and second bearings 24, 25, it is not positioned overhanging relative to one of the two bearings 24, 25, which ensures improved distribution of the forces. The locking gear 50 and the input gear 40 of the reduction device 4 are therefore positioned axially on either side of the second bearing 25.

Figure 3:
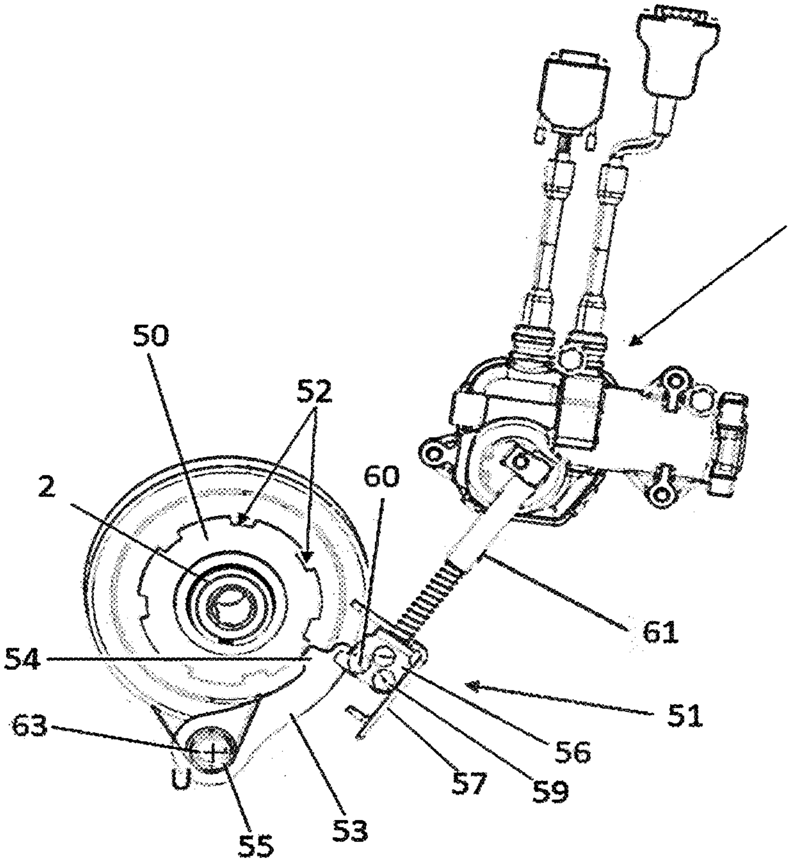
FIG. 3 is a detailed view of the locking device provided in the propulsion system in FIGS. 1 and 2.

As shown in FIG. 3, the locking gear 50 has a plurality of recesses 52 evenly spaced apart from each other, over the entire periphery of said locking gear 50. Furthermore, the locking mechanism 51 is arranged to adopt a locked state in which it interacts with one of the recesses 52 of the locking gear 50 so as to prevent it from rotating. To this end, the locking mechanism 51 comprises a pawl 53 that is pivotably mounted on the casing 6 about an axis U, parallel to the axis X. The pawl 53 is pivotably mounted about a rod 63 that is fastened to the casing 6. The pawl 53 is provided with a locking finger 54. The pawl 53 is further movable between a locked position in which the locking finger 53 is capable of being housed in one of the recesses 52 of the locking gear 50 and a released position, shown in FIG. 3, in which said locking finger 54 is disengaged from the recesses 52 of the locking gear 50. The locking mechanism 51 also comprises return means, here a torsion spring 55, which makes it possible to return the pawl 53 to the released position.

In addition, the locking mechanism 51 comprises a movable carriage 56 that is guided in translation on the casing 6 by means of a guide rail 57. The movable carriage 56 comprises a first roller 59 that rolls against a guide surface of the guide rail 57 and a second roller 60 that interacts with a cam surface of the pawl 53. The cam surface of the pawl 53 is configured so that the translation of the movable carriage 56 pivots the pawl 53 between the released position and the locked position. The movable carriage 56 is fastened to the end of a rod 61 that is translated by an actuator 62. Advantageously, the actuator 62 is positioned outside the casing 6. The casing 6 also comprises an orifice that makes it possible for a shaft of the actuator 62 to be rigidly connected to the rod 61 through the casing 6.

Figure 4:
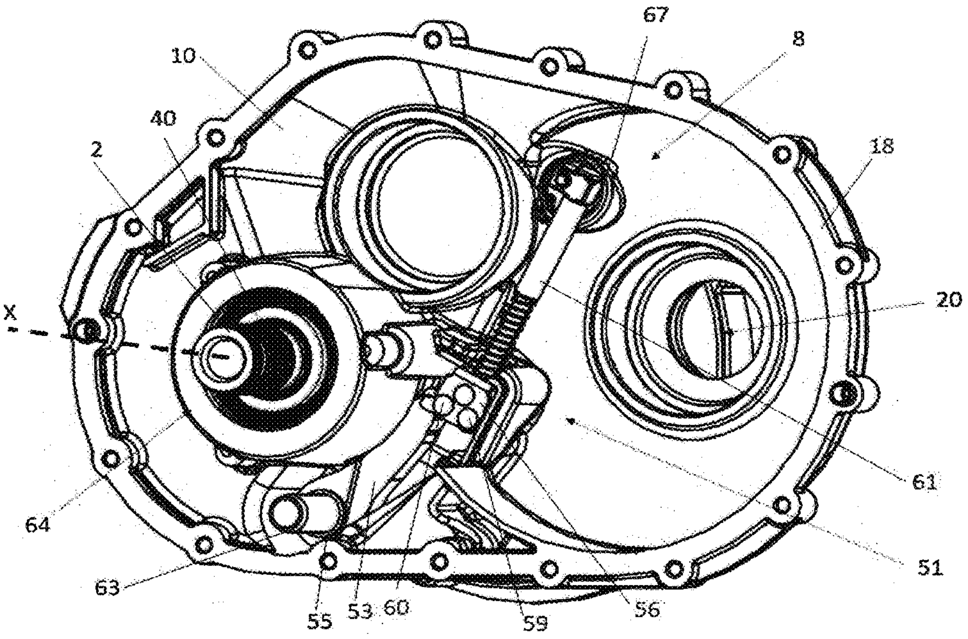
FIG. 4 is a perspective view of the arrangement of the locking mechanism in the transmission space of the propulsion system in FIGS. 1 to 3.
Figure 5:
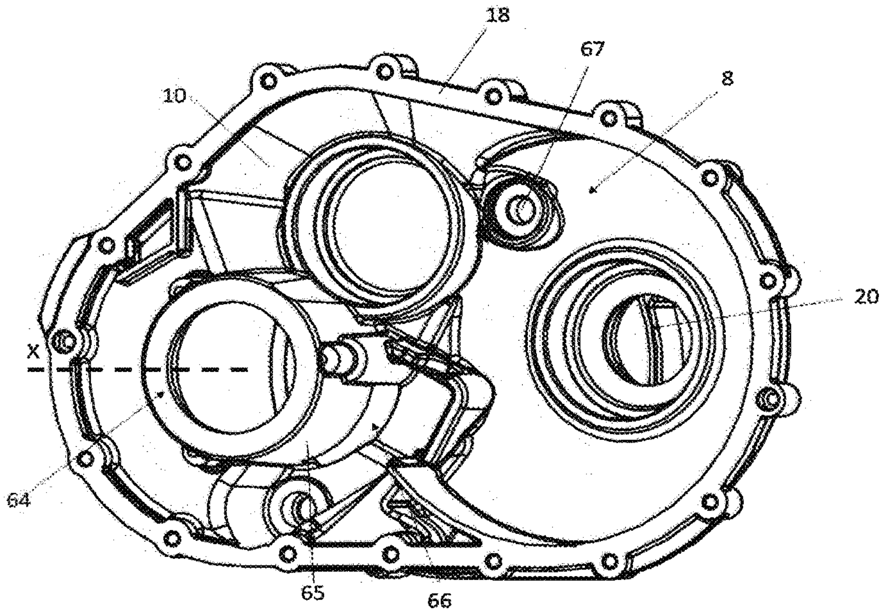
FIG. 5 is a perspective view of one of the parts of the casing defining the transmission space and in which the locking mechanism is not shown.

In the embodiment shown, as illustrated in FIG. 4, the locking mechanism 51 is housed in the transmission compartment 8. This has the effect of simplifying the mounting of the locking mechanism 51 as the rod 63 on which the pawl 53 is pivotably mounted can in particular be mounted bearing on the second part 10 and on the third part 11 of the casing 6. To this end, according to one embodiment, the two ends of the rod 63 are respectively fitted into a recess in the second part 10 and the third part 11 of the casing 6. In addition, as the transmission compartment 8 has a larger radial dimension than the motor compartment 7, it has sufficient dimensions to house the locking mechanism 51. In order to make it possible for the locking mechanism 51, positioned in the transmission compartment 8, to act on the locking gear 50, which is positioned in the motor compartment 7, the end wall 13 defining the motor compartment 7 and the transmission compartment 8 comprises a protruding portion 64 that protrudes toward the transmission compartment 8 and in which the primary shaft 2 passes. The locking gear 50 is also housed inside this protruding portion 64. This protruding portion 64 comprises an axially-oriented skirt 65 that extends around the primary shaft 2. The protruding portion 64 comprises an opening 66, in particular visible in FIG. 5, that is made radially facing the locking gear 50. As shown in FIG. 4, the locking finger 54 of the pawl 53 passes through said opening 66 and is thus capable of interacting with the locking gear 50.

In addition, in the embodiment in FIG. 4, the locking mechanism 51 is fastened to the second part 10 of the casing 6. The guide rail 57 is thus fastened to the second part 2, which also comprises an orifice 67, visible in FIGS. 4 and 5, through which a shaft of the actuator 62 passes. In this embodiment, as shown in FIG. 1, the actuator 62 is thus positioned outside the casing 6 and positioned relative to the transmission compartment 8 on the same side as the motor compartment 7. The actuator 62 is thus positioned radially outside the motor compartment 7.

FIG. 6 illustrates a propulsion system 1 according to a second embodiment. This embodiment mainly differs from the one described above with reference to FIGS. 1 to 5 in that the locking mechanism 51 is not fastened to the second part 10 of the casing 6 but to the third part 11. In this case, the guide rail 57 is fastened to the third part of the casing 6, which comprises an orifice, not shown in FIG. 6, through which a shaft of the actuator 62 passes. In particular, as illustrated in FIG. 6, the guide rail 57 is fastened inside a recess in the third part 11 that is defined by walls, one of which is denoted by reference sign 68 in FIG. 6, protruding from the third part 11 toward the second part 10 of the casing 6.

In this embodiment, as shown in FIG. 6, the actuator 62 is positioned outside the casing 6 and positioned relative to the transmission compartment 8 on the opposite side from the motor compartment 7.

According to one variant embodiment, the locking gear 50 can be arranged in a first plane and the pawl 53 can pivot in a second plane separate from the first plane, the second plane being in particular non-parallel to the first plane, for example substantially perpendicular to the first plane.

Figure 7:
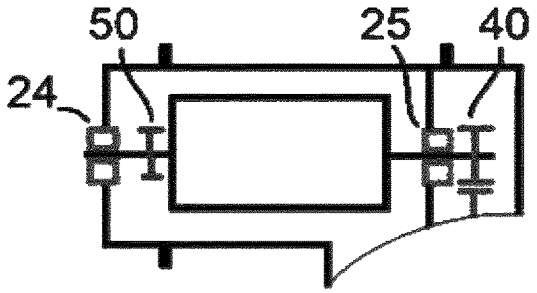
FIG. 7 is a partial diagram of a propulsion system according to a third embodiment.

FIG. 7 diagrammatically shows a third embodiment. The casing comprises at least three parts. As in the two preceding embodiments, the casing comprises a motor compartment and a transmission compartment. These two compartments are separated by a second end wall inside which the second bearing 25 is mounted.

However, this third embodiment is distinguished from the two preceding embodiments in that the locking gear 50 is positioned axially on the other side of the input gear 40 relative to the rotor. In other words, the locking gear 50 is situated axially between the first bearing 24 and the rotor. The second bearing 25 is again positioned axially between the rotor and the input gear 40.

Figure 8:
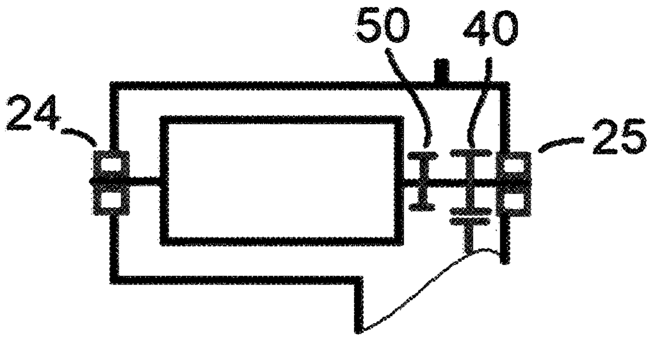
FIG. 8 is a partial diagram of a propulsion system according to a fourth embodiment.

FIG. 8 diagrammatically shows a fourth embodiment. Here, the casing comprises a common space for the electric motor and the reduction device. In other words, the motor space and the transmission space are not truly separated into compartments. The first bearing 24 and the second bearing 25 are positioned axially on either side of the rotor, the locking gear 50 and the input gear 40. The primary shaft is guided by the first and second bearings 24, 25 on its two end zones. The second bearing 25 is housed in a cavity of the casing. The locking gear 50 is positioned axially between the input gear 40 and the rotor.

Figure 9:
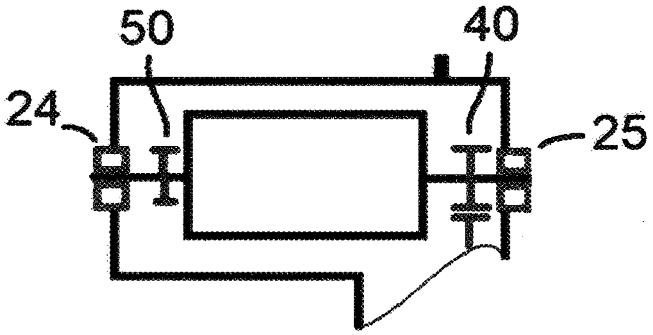
FIG. 9 is a partial diagram of a propulsion system according to a fifth embodiment.

FIG. 9 diagrammatically shows a fifth embodiment in which the casing comprises a common space for the electric motor and the reduction device. The first bearing and the second bearing are positioned axially on either side of the rotor, the locking gear 50 and the input gear 40. The primary shaft is guided by the first and second bearings 24, 25 on its two end zones. The locking gear 50 is positioned axially on the other side of the input gear 40 relative to the rotor. In other words, the locking gear 50 is situated axially between the first bearing 24 and the rotor.

Figure 10:
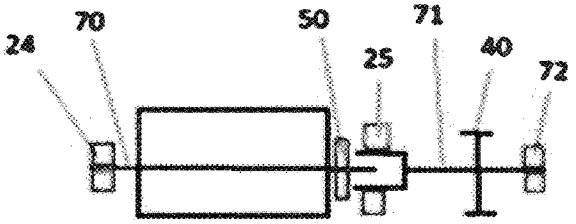
FIG. 10 is a partial diagram of a propulsion system according to a sixth embodiment.

A sixth embodiment is shown diagrammatically in FIG. 10. In this embodiment, the primary shaft comprises a rotor shaft 70 and an input shaft 71 coupled to each other. Furthermore, the primary shaft is guided in rotation by a third bearing in addition to the first bearing 24 and the second bearing 25. In this case, the input shaft 71 that holds the input gear 40 bears on the casing on either side of the input gear 40 via the second bearing 25 and the third bearing 72, while the rotor shaft 70 bears on the casing on the other side of the rotor by means of the first bearing 24. A first end of the rotor shaft is guided in rotation in the first bearing and the second end of the rotor shaft opposite the first end is coupled to the input shaft inside a coupling sleeve formed at the end of the input shaft. The coupling sleeve is guided in rotation inside the second bearing 25.

According to one variant, not shown, the rotor shaft 71 bears on the casing on either side of the rotor via the first bearing 24 and the second bearing 25, while the input shaft bears on the casing via a third bearing on the other side of the input gear. A first end of the input shaft is guided in rotation in the third bearing and the second end of the input shaft opposite the first end is coupled inside a coupling sleeve formed at the end of the rotor shaft. The coupling sleeve is guided in rotation inside the second bearing 25.

In FIG. 10, the locking gear 50 is positioned axially between the rotor and the second bearing 25.

Figure 11:
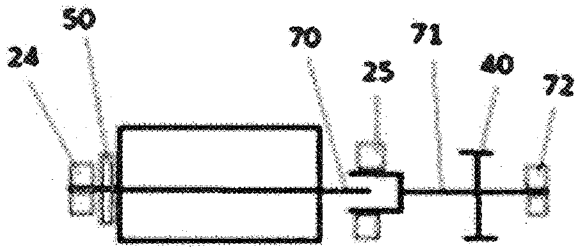
FIG. 11 is a partial diagram of a propulsion system according to a seventh embodiment.

The variant embodiment shown in FIG. 11 differs from the variant in FIG. 10 only in that the locking gear is positioned axially between the rotor and the first bearing 24.

Although the invention has been described with reference to several specific embodiments, it is obvious that it is in no way limited thereto and that it includes all technical equivalents of the means described and any combinations thereof if these fall within the scope of the invention.

In particular, although in the embodiments described above, the locking mechanism 51 is housed in the transmission compartment 8, according to other embodiments not shown, it can also be fully or partially housed in the motor compartment 7.

The use of the verbs “have”, “comprise” or “include” and conjugated forms thereof does not exclude the presence of elements or steps other than those stated in a claim.

In the claims, any reference sign between parentheses should not be interpreted as limiting the claim.

The invention claimed is:

1. A propulsion system for a mobility apparatus, comprising:

a casing comprising a motor space;

an electric motor that is housed in the motor space, said electric motor comprising a stator fastened inside the motor space and a rotor rigidly mounted on a primary shaft for rotation therewith, the primary shaft being guided in rotation about an axis, relative to the casing, with a plurality of bearings, the plurality of bearings comprising at least a first bearing and a second bearing, the first bearing and the second bearing being respectively positioned axially on either side of the rotor, none of the bearings of the plurality of bearings being positioned axially between the first bearing and the second bearing; and a locking gear that is rigidly connected to the primary shaft for rotation therewith about the axis, said locking gear being capable of and intended for interacting with a locking mechanism that is arranged to adopt a locked state in which said locking mechanism interacts with the locking gear so as to prevent the locking gear from rotating about the axis, said locking gear being positioned axially between the first bearing and the second bearing.

2. The propulsion system as claimed in claim 1, wherein the locking gear is integrally formed with the primary shaft.

3. The propulsion system as claimed in claim 1, wherein the locking gear comprises a plurality of cavities, the propulsion system comprising a locking mechanism comprising a locking finger that is able to move between a released position and a locked position in which said locking finger is capable of being housed in one of the cavities of the locking gear so as to prevent the locking gear from rotating.

4. The propulsion system as claimed in claim 3, wherein the locking mechanism further comprises:

a pawl that is pivotably mounted on the casing and comprises the locking finger, said pawl comprising a cam surface; and a movable carriage that is guided in translation with a guide rail fastened to the casing, the movable carriage comprising a cam follower capable of moving on the cam surface of the pawl in order to pivot said pawl and thus move the locking finger between the released position and the locked position.

5. The propulsion system as claimed in claim 3, further comprising an actuator that interacts with the locking mechanism so as to move the locking finger between the released position and the locked position.

6. The propulsion system as claimed in claim 5, wherein the actuator is positioned outside the casing.

7. The propulsion system as claimed in claim 1, wherein the propulsion system comprises a reduction device comprising an input gear that is coaxial with the axis and rigidly connected to the primary shaft for rotation therewith, the reduction device being housed in a transmission space of the casing.

8. The propulsion system as claimed in claim 7, wherein the input gear and the locking gear are arranged axially on either side of the rotor.

9. The propulsion system as claimed in claim 7, wherein the input gear and the locking gear are arranged axially on the same side of the rotor, the locking gear being arranged axially between the rotor and the input gear.

10. The propulsion system as claimed in claim 1, wherein the primary shaft is guided by only the first bearing and the second bearing.

11. The propulsion system as claimed in claim 1, wherein the casing comprises a first and a second end wall, the first and second end walls respectively comprising a first recess and a second recess, the first bearing and the second bearing being housed in the first recess and in the second recess respectively.

12. The propulsion system as claimed in claim 11, wherein the primary shaft passes through the second end wall, the locking gear and the input gear being positioned axially on the same side of the rotor and axially on either side of at least one of the second end wall and/or and the second bearing.

13. The propulsion system as claimed in claim 11, wherein the second end wall comprises an opening that is made facing at least one cavity of the locking gear and through which a locking finger of the locking mechanism can pass when said locking finger is in a locked position.

14. The propulsion system as claimed in claim 13, wherein the cavities are made on a periphery of said locking gear, the second end wall comprising a protruding portion that protrudes axially in the opposite direction to the motor compartment and in which the second bearing is positioned, the locking gear being housed in said protruding portion, the opening being made in said protruding portion radially facing the periphery of the locking gear.

15. The propulsion system as claimed in claim 2, wherein the locking gear comprises a plurality of cavities, the propulsion system comprising a locking mechanism comprising a locking finger that is able to move between a released position and a locked position in which said locking finger is capable of being housed in one of the cavities of the locking gear so as to prevent the locking gear from rotating.

16. The propulsion system as claimed in claim 4, further comprising an actuator that interacts with the locking mechanism so as to move the locking finger between the released position and the locked position.

17. The propulsion system as claimed in claim 2, wherein the propulsion system comprises a reduction device comprising an input gear that is coaxial with the axis and rigidly connected to the primary shaft for rotation therewith, the reduction device being housed in a transmission space of the casing.

18. The propulsion system as claimed in claim 2, wherein the primary shaft is guided by only the first bearing and the second bearing.

19. The propulsion system as claimed in claim 2, wherein the casing comprises a first and a second end wall, the first and second end walls respectively comprising a first recess and a second recess, the first bearing and the second bearing being housed in the first recess and in the second recess respectively.

20. The propulsion system as claimed in claim 12, wherein the second end wall comprises an opening that is made facing at least one cavity of the locking gear and through which a locking finger of the locking mechanism can pass when said locking finger is in a locked position.

* * * * *